US012261371B2

(12) United States Patent
Sudo et al.

(10) Patent No.: US 12,261,371 B2
(45) Date of Patent: Mar. 25, 2025

(54) ANTENNA MODULE AND COMMUNICATION DEVICE INCORPORATING THE SAME

(71) Applicant: Murata Manufacturing Co., Ltd., Nagaokakyo (JP)

(72) Inventors: Kaoru Sudo, Nagaokakyo (JP); Kengo Onaka, Nagaokakyo (JP); Yoshiki Yamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 123 days.

(21) Appl. No.: 18/090,519

(22) Filed: Dec. 29, 2022

(65) Prior Publication Data

US 2023/0139670 A1 May 4, 2023

Related U.S. Application Data

(63) Continuation of application No. PCT/JP2021/016805, filed on Apr. 27, 2021.

(30) Foreign Application Priority Data

Jul. 1, 2020 (JP) ................................ 2020-114111

(51) Int. Cl.
*H01Q 21/30* (2006.01)
*H01Q 1/24* (2006.01)
(Continued)

(52) U.S. Cl.
CPC ............. *H01Q 21/30* (2013.01); *H01Q 1/243* (2013.01); *H01Q 1/48* (2013.01); *H01Q 9/045* (2013.01); *H01Q 21/06* (2013.01)

(58) Field of Classification Search
CPC .. H01Q 21/0006; H01Q 21/06; H01Q 21/065; H01Q 21/08; H01Q 21/24;
(Continued)

(56) References Cited

U.S. PATENT DOCUMENTS 8,102,330 B1 * 1/2012 Albers .................... H01Q 5/40 343/756
11,171,421 B2 * 11/2021 Yamada ................ H01Q 21/08
(Continued)

FOREIGN PATENT DOCUMENTS

JP 5-167337 A 7/1993
JP 2001-60823 A 3/2001
(Continued)

OTHER PUBLICATIONS

International Search Report and Written Opinion mailed on Jun. 8, 2021, received for PCT Application PCT/JP2021/016805, filed on Apr. 27, 2021, 9 pages including English Translation.

*Primary Examiner* — Jason M Crawford
(74) *Attorney, Agent, or Firm* — XSENSUS LLP

(57) ABSTRACT

An antenna module includes feed elements each having a flat plate shape and a ground electrode arranged opposite the feed elements. The feed element radiates a radio wave of a first frequency band. The feed element radiates a radio wave of a second frequency band that is higher than the first frequency band. In a plan view of the feed element, the distance from the center of the feed element to an end portion of the ground electrode in a first direction is shorter than or equal to ½ of a free space wavelength of a radio wave radiated from the feed element. A feed point of the feed element is arranged at a location shifted in a second direction from the center of the feed element, and the second direction is different from the first direction.

19 Claims, 7 Drawing Sheets

(51) Int. Cl.

| | |
|---|---|
| ***H01Q 1/48*** | (2006.01) |
| ***H01Q 9/04*** | (2006.01) |
| ***H01Q 21/06*** | (2006.01) |

(58) Field of Classification Search

CPC ...... H01Q 21/28; H01Q 21/30; H01Q 9/0407; H01Q 9/0414; H01Q 9/0435; H01Q 9/045; H01Q 1/243

See application file for complete search history.

(56) References Cited

U.S. PATENT DOCUMENTS

| | | | | |
|---|---|---|---|---|
| 2015/0333407 | A1* | 11/2015 | Yamagajo | H01Q 5/307<br>343/905 |
| 2020/0287298 | A1* | 9/2020 | Ueda | H01Q 9/0407 |
| 2020/0358203 | A1* | 11/2020 | Park | H01Q 21/08 |
| 2020/0395679 | A1* | 12/2020 | Lim | H01Q 21/0025 |
| 2021/0057820 | A1* | 2/2021 | Sudo | H01Q 1/2283 |
| 2021/0083380 | A1* | 3/2021 | Takayama | H01Q 5/28 |
| 2021/0135364 | A1* | 5/2021 | Yamada | H01Q 9/045 |
| 2022/0336962 | A1* | 10/2022 | Park | H01Q 1/40 |
| 2023/0139670 | A1* | 5/2023 | Sudo | H01Q 9/0414<br>343/893 |
| 2023/0411866 | A1* | 12/2023 | Yamada | H01Q 1/38 |
| 2024/0154315 | A1* | 5/2024 | Nemoto | H01Q 9/0414 |

FOREIGN PATENT DOCUMENTS

| | | | |
|---|---|---|---|
| JP | 2003-152431 | A | 5/2003 |
| JP | 2019-92130 | A | 6/2019 |
| WO | 2018/230475 | A1 | 12/2018 |
| WO | 2020/040079 | A1 | 2/2020 |

* cited by examiner

ANTENNA MODULE AND COMMUNICATION DEVICE INCORPORATING THE SAME

CROSS-REFERENCE TO RELATED APPLICATIONS

The present application is a continuation of International Patent Application No. PCT/JP2021/016805, filed Apr. 27, 2021, which claims priority to Japanese Patent Application No. 2020-114111, filed Jul. 1, 2020, the entire contents of each of which being incorporated herein by reference.

TECHNICAL FIELD

The present disclosure relates to an antenna module and a communication device incorporating the antenna module, and more specifically relates to an antenna layout of an antenna module in which a board dimension is constrained.

BACKGROUND ART

In recent years, a communication terminal device typified by a mobile phone or a smartphone is configured in such a manner as to be able to transmit and receive a plurality of radio waves of different frequency bands. In such a multiband communication device, antenna elements each corresponding to a radio wave of each frequency band are installed.

Japanese Unexamined Patent Application Publication No. 2003-152431 (Patent Document 1) discloses a multifrequency planar antenna that can be used in a plurality of frequency bands, at least one of which uses a circularly polarized wave. In the antenna of Japanese Unexamined Patent Application Publication No. 2003-152431 (Patent Document 1), a plurality of radiating electrodes are formed in a concentric fashion on the same plane, and further a 90 degree hybrid for supplying a radio frequency signal to each radiating electrode is formed in such a manner as to be concentric with the radiating electrodes. With such a configuration, a small-size planar-type composite antenna having good circularly polarized wave characteristics can be realized.

CITATION LIST

Patent Document

Patent Document 1: Japanese Unexamined Patent Application Publication No. 2003-152431

SUMMARY

Technical Problems

In mobile terminals such as mobile phones or smartphones, there are needs for further downsizing and thinning. Because of this, internal devices such as an antenna module also need to be downsized, and profile heights of these internal devices need to be reduced. Particularly, in the case where a display screen is formed on the whole principal surface of the device such as a smartphone, there is a limitation on the area where an antenna device, in which antenna elements (radiating elements) are formed in the inside of a communication device, can be arranged. Further, the dimension of the antenna device itself may also be constrained.

In the case where a patch antenna having a flat plate shape is used as a radiating element, the patch antenna functions as an antenna by using electromagnetic coupling established between the radiating element and a ground electrode arranged opposite the radiating element. However, in the case where the dimension constraint of the antenna device makes it difficult to secure a sufficient area for the ground electrode, there is a possibility that desired antenna characteristics cannot be realized because the electromagnetic coupling between the radiating element and the ground electrode becomes insufficient or the electromagnetic coupling is disturbed.

Issues such as the ones described above caused by the dimension constraint are not considered in Japanese Unexamined Patent Application Publication No. 2003-152431 (Patent Document 1).

The present disclosure is made to resolve such issues, as well as other issues, and thus an aspect thereof is to suppress degradation of antenna characteristics in an antenna module capable of radiating radio waves of two different frequency bands.

Solutions to Problems

An antenna module in accordance with a certain aspect of the present disclosure includes a first radiating element and a second radiating element each having a flat plate shape and a ground electrode arranged opposite the first radiating element and the second radiating element. The first radiating element radiates a radio wave in a first frequency band. The second radiating element radiates a radio wave in a second frequency band that is higher than the first frequency band. In a plan view, as seen from a normal direction of the first radiating element, a distance from a center of the first radiating element to an end portion of the ground electrode in a first direction is shorter than ½ of a free space wavelength of a radio wave radiated from the first radiating element. The first radiating element radiates a radio wave of a single polarization direction. A feed point of the first radiating element is arranged at a location shifted in a second direction from the center of the first radiating element, and the second direction is different from the first direction. A feed point of the second radiating element is arranged at a location shifted in a third direction from a center of the second radiating element.

An antenna module in accordance with another aspect of the present disclosure includes a first radiating element and a second radiating element each having a flat plate shape and a ground electrode arranged opposite the first radiating element and the second radiating element. The first radiating element radiates a radio wave in a first frequency band. The second radiating element radiates a radio wave in a second frequency band that is higher than the first frequency band. In a plan view seen from a normal direction of the first radiating element, a dimension of the ground electrode in a first direction is shorter than a dimension of the ground electrode in a second direction that is different from the first direction. The first radiating element radiates a radio wave in a single polarization direction. A feed point of the first radiating element is arranged at a location shifted in the second direction from a center of the first radiating element, and the second direction is different from the first direction. Feed points of the second radiating element are arranged at a location shifted in a third direction from a center of the second radiating element and at a location shifted in a fourth direction from the center of the second radiating element, and the fourth direction is different from the third direction.

Advantageous Effects of Disclosure

According to the antenna modules in accordance with the present disclosure, under an environment where there is a constraint on the dimension of the ground electrode, with regard to the first radiating element on the low frequency side, for which a sufficient distance from the ground electrode cannot be secured in the plan view, a feed point is provided in a direction that is different from a dimension constraint direction (first direction), and with regard to the second radiating element on the high frequency side, which suffers less impact of the dimension constraint, feed points are provided in two directions. With such configuration, in the radiating element on the low frequency side, a polarized wave for which the antenna characteristics become insufficient is suppressed, and in the radiating element on the high frequency side, radio waves of two polarized waves can be radiated. Therefore, in a dual-band-type antenna module, degradation of antenna characteristics can be suppressed.

DESCRIPTION OF EMBODIMENTS

Figure 1:
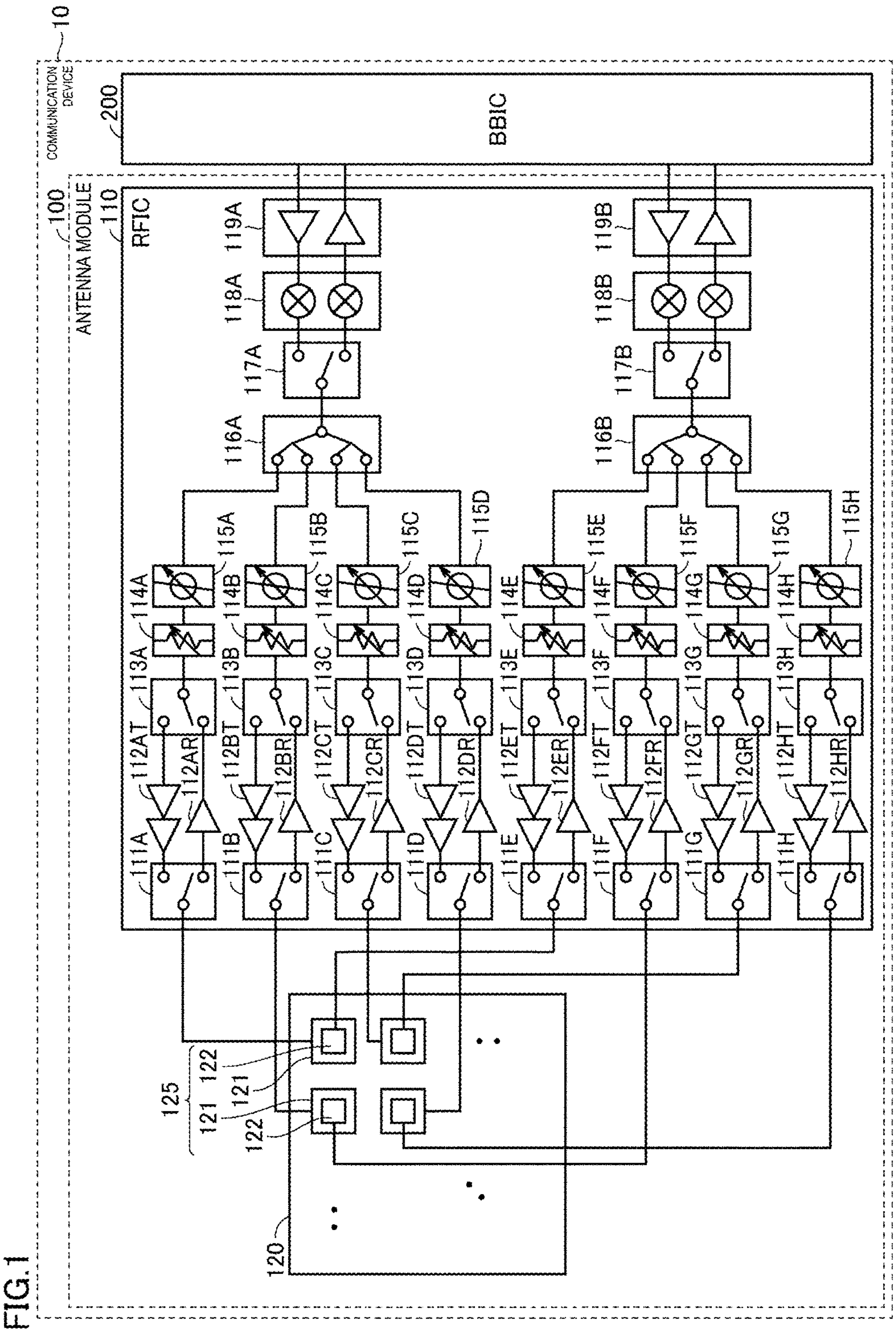
FIG. 1 is a block diagram of a communication device in which an antenna module according to an embodiment is employed.

Hereinafter, embodiments of the present disclosure will be described in detail with reference to the drawings. Note that the same reference symbols are assigned to the same or corresponding parts in the drawings, and descriptions thereof will not be repeated.

Embodiment (Basic Configuration of Communication Device)

FIG. 1 is a block diagram of one example of a communication device 10 in which an antenna module 100 according to the present embodiment is employed. The communication device 10 is, for example, a mobile terminal such as a mobile phone, a smartphone, a tablet, or the like, a personal computer with communication capability, or the like.

Referring to FIG. 1, the communication device 10 includes the antenna module 100 and a BBIC 200, which makes up a baseband signal processing circuit. The antenna module 100 includes a RFIC 110, which is one example of a feed circuit, and an antenna device 120. The communication device 10 up-converts a signal, which is sent from the BBIC 200 to the antenna module 100, into a radio frequency signal and radiates the radio frequency signal from the antenna device 120, and further down-converts a radio frequency signal received by the antenna device 120 and performs processing on a down-converted signal in the BBIC 200.

The antenna device 120 of FIG. 1 has a configuration in which radiating elements 125 are arranged in a two-dimensional array shape. Each of the radiating elements 125 includes two feed elements 121 and 122. The feed elements 121 and 122 are arranged in such a manner as to overlap each other in the normal direction of the feed elements, as will be described below with reference to FIG. 2. The antenna device 120 is configured to be able to radiate radio waves of different frequency bands from the feed element 121 and the feed element 122 of the radiating element 125. That is to say, the antenna device 120 is a stack-type dual-band-type antenna device. Different radio frequency signals are supplied to the feed elements 121 and 122 from the RFIC 110.

In FIG. 1, for ease of description, of a plurality of radiating elements 125 that makes up the antenna device 120, only a configuration corresponding to four radiating elements 125 is illustrated, and configurations corresponding to other radiating elements 125 having a similar configuration are omitted. Note that the antenna device 120 is not necessarily a two-dimensional array. Alternatively, the antenna device 120 may be made up of a single radiating element 125. Further, the antenna device 120 may alternatively be a one-dimensional array in which a plurality of radiating elements 125 are arranged in a row. In the present embodiment, the feed elements 121 and 122 included in the radiating element 125 are each a patch antenna having a flat plate shape.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiner/splitters 116A and 116B, mixers 118A and 118B, and amplifier circuits 119A and 119B. Of these, the configuration including the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/splitter 116A, the mixer 118A, and the amplifier circuit 119A is a circuit for a radio frequency signal of a first frequency band on the low frequency side, which is radiated from the feed element 121. Further, the configuration including the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/splitter 116B, the mixer 118B, and the amplifier circuit 119B is a circuit for a radio frequency signal of a second frequency band on the high frequency side, which is radiated from the feed element 122.

When a radio frequency signal is transmitted, the switches 111A to 111H and 113A to 113H are switched to the sides of the power amplifiers 112AT to 112HT, and the switches 117A and 117B are connected to transmitting side amplifiers of the amplifier circuits 119A and 119B. When a radio frequency signal is received, the switches 111A to 111H and 113A to 113H are switched to the sides of the low noise amplifiers 112AR to 112HR, and the switches 117A and 117B are connected to receiving side amplifiers of the amplifier circuits 119A and 119B.

Signals sent from the BBIC 200 are amplified in the amplifier circuits 119A and 119B and up-converted in the mixers 118A and 118B. Transmitting signals, which are up-converted radio frequency signals, are split into four signals in the signal combiner/splitters 116A and 116B, and these four signals are each fed to different feed elements 121 and 122 after traveling through corresponding signal paths. The directivity of the antenna device 120 can be adjusted by separately adjusting the degree of phase shift in the phase shifters 115A to 115H that are arranged in the respective signal paths.

Received signals, which are radio frequency signals received by the respective feed elements 121 and 122, are sent to the RFIC 110 and multiplexed in the signal combiner/splitters 116A and 116B after traveling through the four different signal paths. Multiplexed received signals are down-converted in the mixers 118A and 118B, amplified in the amplifier circuits 119A and 119B, and sent to the BBIC 200.

The RFIC 110 is formed as, for example, a one-chip integrated circuit component including the foregoing circuit configuration. Alternatively, devices (switch, power amplifier, low noise amplifier, attenuator, and phase shifter) corresponding to each radiating element 125 in the RFIC 110 may be formed as a one-chip integrated circuit component for each radiating element 125.

(Configuration of Antenna Module)

Figure 2:
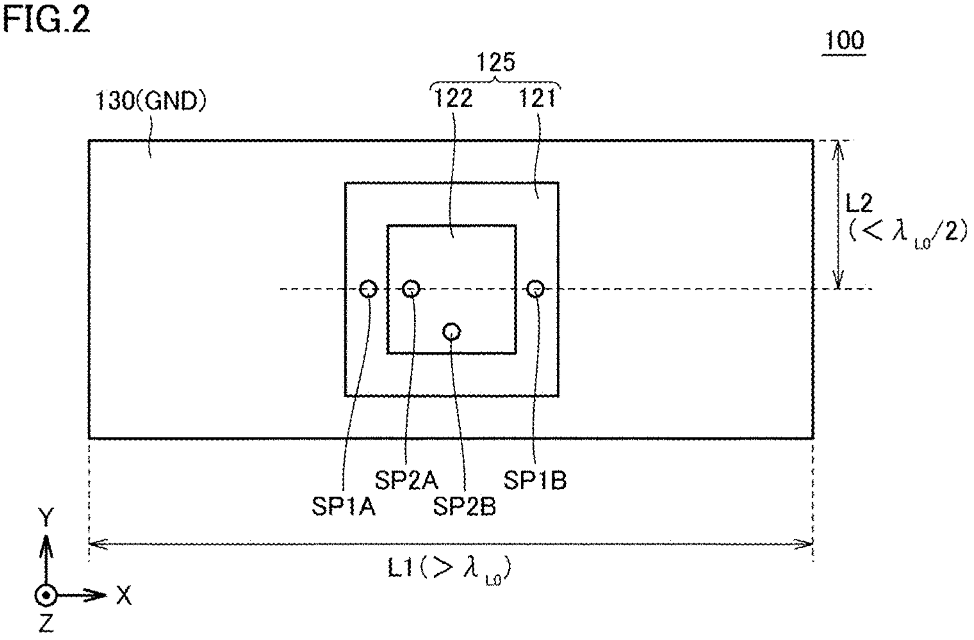
FIG. 2 is a plan transparent view of the antenna module according to the embodiment.
Figure 3:
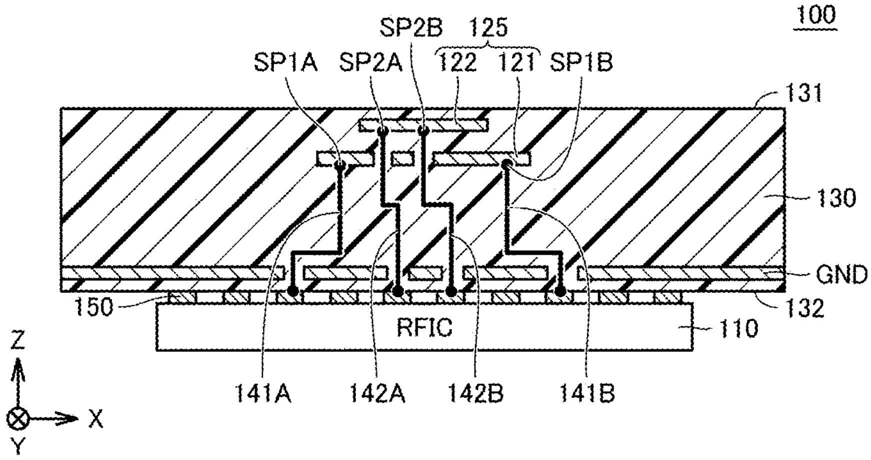
FIG. 3 is a side transparent view of the antenna module of FIG. 2.

Next, referring to FIG. 2 and FIG. 3, the configuration of the antenna module 100 according to the present embodiment is described in detail.

FIG. 2 illustrates a plan transparent view of the antenna module 100, and FIG. 3 is a side transparent view of the antenna module 100. In the following description, for ease of description, the antenna module is described using an example in which a single radiating element 125 is formed. Note that as illustrated in FIG. 2 and FIG. 3, the thickness direction of the antenna module 100 is the Z-axis direction, and a plane vertical to the Z-axis direction is defined by the X-axis and the Y-axis. Further, in some cases, the positive direction of the Z-axis is referred to as a top surface side and the negative direction of the Z-axis is referred to as a bottom surface side in the respective drawings.

Referring to FIG. 2 and FIG. 3, the antenna module 100 includes, in addition to the RFIC 110 and the radiating element 125 (feed elements 121 and 122), a dielectric substrate 130, feed lines 141A, 141B, 142A, and 142B, and a ground electrode GND. In the plan transparent view, the RFIC 110, the dielectric substrate 130, and the respective feed lines are omitted.

The dielectric substrate 130 is, for example, a low temperature co-fired ceramics (LTCC) multilayer substrate, a multilayer resin substrate formed by laminating a plurality of resin layers, each of which is composed of a resin such as epoxy, polyimide, or the like, a multilayer resin substrate formed by laminating a plurality of resin layers, each of which is composed of a liquid crystal polymer (LCP) having a lower dielectric constant, a multilayer resin substrate formed by laminating a plurality of resin layers, each of which is composed of a fluorine-based resin, or a ceramics multilayer substrate other than LTCC. Note that the dielectric substrate 130 is not necessarily a multilayer substrate and may alternatively be a single layer substrate.

In the plan view seen from the normal direction (Z-axis direction), the dielectric substrate 130 is formed in a rectangular shape or a substantially rectangular shape, which has long sides parallel to the X-axis and short sides parallel to the Y-axis. On a bottom surface 132 (surface in the negative direction of the Z-axis) side of the dielectric substrate 130, the ground electrode GND that has substantially the same rectangular shape as the dielectric substrate 130 is arranged. On a top surface 131 (surface in the positive direction of the Z-axis) side of the dielectric substrate 130, the feed element 122 is arranged opposite the ground electrode GND. The feed element 122 may be configured in such a manner as to be exposed on the top surface 131 of the dielectric substrate 130 or may be arranged in an internal layer of the dielectric substrate 130 as illustrated in the example of FIG. 3. The feed element 121 is arranged opposite the ground electrode GND in a layer that is located closer to the ground electrode GND than the feed element 122. In other words, the feed element 121 is arranged in a layer located between the layer in which the feed element 122 is formed and the layer in which the ground electrode GND is formed.

The feed elements 121 and 122 each have a flat plate shape and are each formed of an electric conductor such as copper, aluminum, or the like. In the example of FIG. 2, in the plan view seen from the normal direction of the dielectric substrate 130, the feed elements 121 and 122 each have a square shape or a substantially square shape and are each arranged in such a way that each side of the feed elements 121 and 122 is parallel to a side of the dielectric substrate 130 (and the ground electrode GND) having a rectangular shape. Note that the shapes of the feed elements 121 and 122 are not limited to a square shape and may alternatively be a polygonal shape, a circular shape, an elliptical shape, or a cross-like shape.

Further, in the plan view seen from the normal direction of the dielectric substrate 130, the feed element 121 and the feed element 122 are arranged in such a manner as to overlap each other. The size of the feed element 122 is smaller than the size of the feed element 121, and a resonant frequency of the feed element 122 is higher than a resonant frequency of the feed element 121. That is to say, a frequency band (second frequency band) of a radio wave radiated from the feed element 122 is higher than a frequency band (first frequency band) of a radio wave radiated from the feed element 121. For example, the frequency band of a radio wave radiated from the feed element 122 is a 39 GHz band, and the frequency band of a radio wave radiated from the feed element 121 is a 28 GHz band.

The RFIC 110 is mounted on the bottom surface 132 of the dielectric substrate 130 with solder bumps 150 interposed therebetween. Note that instead of using the solder connection, the RFIC 110 may be connected to the dielectric substrate 130 using a multipole connector.

Radio frequency signals are sent to the feed element 121 from the RFIC 110 via the feed lines 141A and 141B. The feed lines 141A and 141B extend from the RFIC 110, penetrate the ground electrode GND, and are connected to feed points SP1A and SP1B from the bottom surface side of the feed element 121, respectively. That is to say, the feed lines 141A and 141B send radio frequency signals to the feed points SP1A and SP1B of the feed element 121, respectively. Note that in the plan view seen from the normal direction of the dielectric substrate 130, the locations of the feed points SP1A and SP1B of the feed element 121 on the low frequency side may overlap the feed element 122 on the high frequency side. However, from the viewpoint of isolation of two radio waves, it is an option that the feed points SP1A and SP1B are arranged at locations that do not overlap the feed element 122.

The feed point SP1A is arranged at a location shifted in the negative direction of the X-axis from the center of the feed element 121. Further, the feed point SP1B is arranged at a location shifted in the positive direction of the X-axis from the center of the feed element 121. Therefore, when radio frequency signals are sent to the feed points SP1A and SP1B, a radio wave whose polarization direction is the X-axis direction is radiated from the feed element 121. A signal whose phase is opposite to the phase of a radio frequency signal supplied to the feed point SP1A is supplied to the feed point SP1B. In other words, the phase difference between a radio frequency signal supplied to the feed point SP1A and a radio frequency signal supplied to the feed point SP1B is 180 degrees. As described above, by separately supplying radio frequency signals whose phases are opposite to each other to the feed points SP1A and SP1B, it becomes possible to double the power of a radio wave radiated from the feed element 121.

Radio frequency signals are sent to the feed element 122 from the RFIC 110 via the feed lines 142A and 142B. The feed lines 142A and 142B extend from the RFIC 110, penetrate the ground electrode GND and the feed element 121, and are connected to feed points SP2A and SP2B from the bottom surface side of the feed element 122. That is to say, the feed lines 142A and 142B send radio frequency signals to the feed points SP2A and SP2B of the feed element 122.

The feed point SP2A is arranged at a location shifted in the negative direction of the X-axis from the center of the feed element 122. Further, the feed point SP2B is arranged at a location shifted in the negative direction of the Y-axis from the center of the feed element 122. Therefore, when a radio frequency signal is sent to the feed point SP2A, a radio wave whose polarization direction is the X-axis direction is radiated from the feed element 122. Further, when a radio frequency signal is sent to the feed point SP2B, a radio wave whose polarization direction is the Y-axis direction is radiated from the feed element 122.

Note that as illustrated in FIG. 3, for the antenna module 100, the configuration has been described in which each of the feed elements 121 and 122 is fed by being directly connected to the feed line. However, the configuration may alternatively be such that one or both of the feed elements 121 and 122 are fed by using capacitive coupling between the one or both of the feed elements 121 and 122 and the corresponding feed line or lines.

As illustrated in FIG. 2, in the plan view seen from the Z-axis direction, the antenna module 100 has a rectangular shape whose long side is in the X-axis direction and whose short side is in the Y-axis direction. In other words, the dimension in the Y-axis direction (first direction) is shorter than the dimension in the X-axis direction (second direction). In the antenna module 100, the distance from an end portion of the feed element 121 to an end portion of the dielectric substrate 130 (that is to say, the ground electrode GND) in the Y-axis direction is made shorter than the corresponding distance in the X-axis direction. For example, in the case where an antenna module is arranged on a side surface of a thin communication device such as a smartphone, the dimension of the communication device in the thickness direction (for example, the dimension in the Y-axis direction in FIG. 2) is limited.

As in the antenna module 100, in the case where a patch antenna having a flat plate shape is used as a radiating element, the patch antenna functions as an antenna by using electromagnetic coupling established between the radiating element and a ground electrode arranged opposite the radiating element. In the case of the antenna module 100, the feed element 121 functions as an antenna by using electromagnetic coupling formed between the feed element 121 and the ground electrode GND. On the other hand, the feed element 122 functions as an antenna because the feed element 121 plays a role of the ground electrode and electromagnetic coupling is formed between the feed element 122 and the feed element 121.

In the case where a sufficient area of the ground electrode cannot be secured due to the dimension constraint of the dielectric substrate and the like, there is a possibility that desired antenna characteristics cannot be realized because the electromagnetic coupling between the radiating element and the ground electrode becomes insufficient or the electromagnetic coupling is disturbed. Accordingly, as in the antenna module 100 illustrated in FIG. 2, in the case where the dimension of the dielectric substrate 130 in the Y-axis direction is constrained, there is a possibility of having an impact on antenna characteristics relating to a radio wave whose polarization direction is the Y-axis direction in the feed element 121 on the low frequency side. More specifically, in the case where the shortest distance L2 from the center of the feed element 121 to an end portion of the ground electrode GND in the Y-axis direction is shorter than ½ of a free space wavelength $\lambda_{LO}$ of a radio wave radiated from the feed element 121, degradation of the antenna characteristics may become prominent.

Therefore, in the foregoing case where the shortest distance L2 is shorter than ½ of the free space wavelength $\lambda_{LO}$, with regard to the feed element 121, the feed points SP1A and SP1B are arranged at locations shifted in the X-axis direction from the center of the feed element 121 in such a way that only a radio wave whose polarization direction is the X-axis direction is radiated. Because of this, a degrading impact on the antenna characteristics associated with the dimension constraint in the Y-axis direction can be removed.

On the other hand, the feed element 122 on the high frequency side functions as an antenna by using the electromagnetic coupling formed between the feed element 122 on the high frequency side and the feed element 121 on the low frequency side as described above, and thus, an impact on the antenna characteristics caused by the dimension constraint of the ground electrode GND is small. Accordingly, in the feed element 122, the feed points SP2A and SP2B are arranged at a location shifted in the X-axis direction and a location shifted in the Y-axis direction from the center of the feed element 122, respectively. Because of this, two radio waves having polarization directions different from each other can be radiated.

Note that the "feed element 121" and the "feed element 122" in the embodiment correspond to a "first radiating element" and a "second radiating element" in the present disclosure, respectively. Further, in the embodiment, the "Y-axis direction" corresponds to the "first direction" and a "third direction" in the present disclosure, and the "X-axis direction" corresponds to the "second direction" and a "fourth direction" in the present disclosure.

Note that in the foregoing description, the example is described in which the direction (first direction) along which the distance between the feed element 121 and the ground electrode GND becomes the shortest and the polarization direction (second direction) of a radio wave radiated from the feed element 121 are orthogonal to each other. However, the first direction and the second direction are not necessarily orthogonal to each other. Further, two polarization directions (third direction and fourth direction) of the feed element 122 are not necessarily orthogonal to each other.

Modified Example 1

Figure 4:
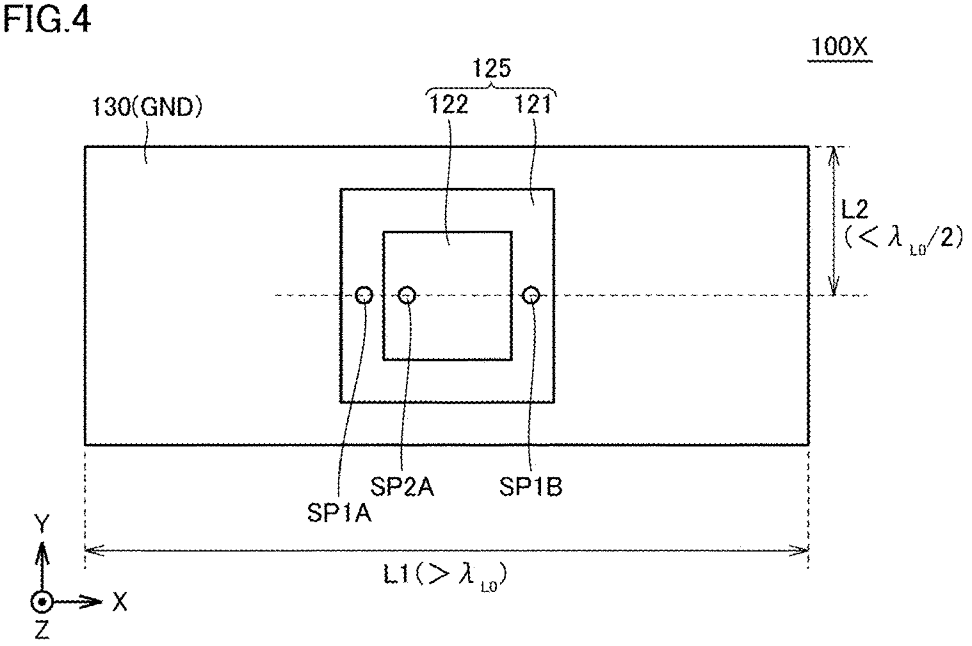
FIG. 4 is a plan transparent view of an antenna module of a modified example 1.

FIG. 4 is a plan transparent view of an antenna module 100X of a modified example 1. The antenna module 100X of the modified example 1 is different from the antenna module 100 in that a radio wave of a single polarization direction is radiated from the feed element 122 on the high frequency side. More specifically, in the feed element 122, a radio frequency signal is supplied only to the feed point SP2A.

As described above, compared with the feed element 121, in the feed element 122 on the high frequency side, the dimension constraint of the ground electrode GND causes a less impact on the antenna characteristics. However, it is not always required to radiate radio waves of two polarization directions, and the configuration may be such that only a radio wave of a single polarization direction is radiated as illustrated in FIG. 4.

Modified Example 2

Figure 5:
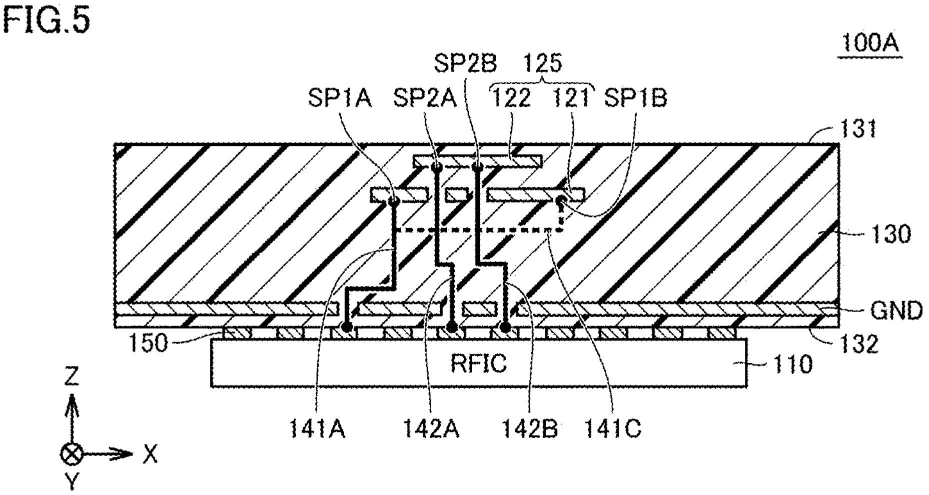
FIG. 5 is a side transparent view of an antenna module of a modified example 2.

FIG. 5 is a side transparent view of an antenna module 100A of a modified example 2. Compared with the antenna module 100, the antenna module 100A of the modified example 2 uses a different method of supplying a radio frequency signal to the feed point SP1B of the feed element 121 on the low frequency side. More specifically, a separate radio frequency signal is not supplied to the feed point SP1B from the RFIC 110. Instead, for the feed point SP1B, a radio frequency signal is supplied by a feed line 141C that branches from the feed line 141A, which supplies a radio frequency signal to the feed point SP1A. At that time, the path length of the feed line 141C is set to a length that gives the phase opposite to that of a signal transmitted to the feed point SP1A (for example, ½ of the wavelength of the signal being transmitted).

Note that in the case of the antenna module 100A, a radio frequency signal is supplied to the feed element 121 from the RFIC 110 using a single path. Thus, the power of a radio wave being radiated becomes ½ of the power of the antenna module 100.

Modified Example 3

Figure 6:
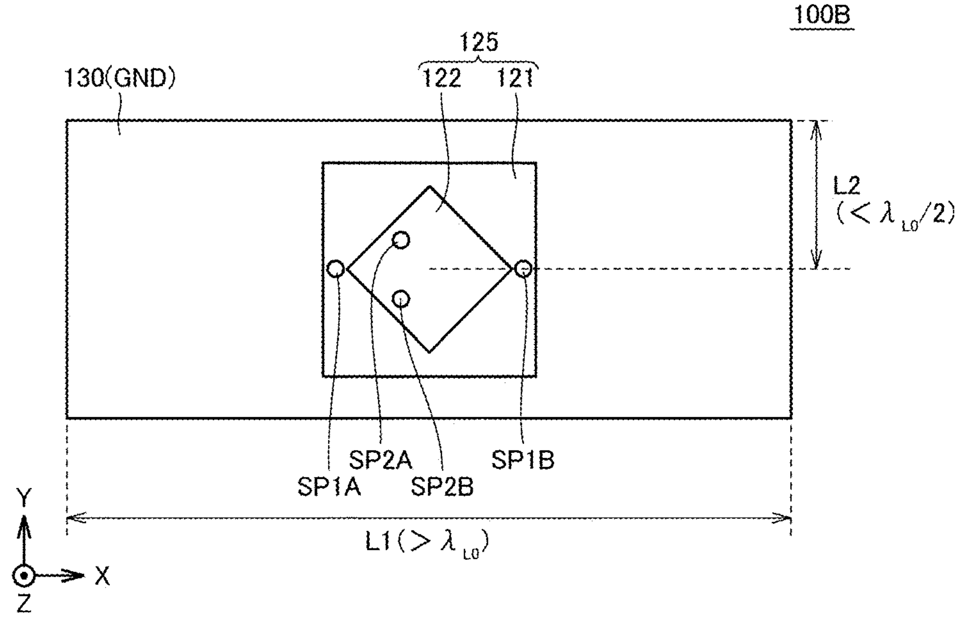
FIG. 6 is a plan transparent view of an antenna module of a modified example 3.

FIG. 6 is a plan transparent view of an antenna module 100B of a modified example 3. In the antenna module 100B of the modified example 3, the feed element 122 on the high frequency side is arranged in such a manner as to be tilted against the feed element 121. Specifically, the feed element 122 is arranged in such a way that an angle formed by each side of the feed element 122 and the X-axis and an angle formed by each side of the feed element 122 and the Y-axis are 45 degrees. Because of this, the feed element 122 radiates radio waves whose polarization directions are directions of 45 degrees and −45 degrees from the X-axis.

As described above, the feed element 122 on the high frequency side functions as an antenna by using electromagnetic coupling formed between the feed element 122 and the feed element 121. Accordingly, in the case where the distance from the center of feed element 122 to the end portion of the feed element 121 in the polarization direction is limited, degradation of the antenna characteristics of the feed element 122 can be suppressed by increasing the foregoing distance by arranging the feed element 122 in such a manner as to be tilted against the feed element 121, as in the antenna module 100B.

Note that in the modified example 3, the "Y-axis direction" and the "X-axis direction" respectively correspond to the "first direction" and the "second direction" of the present disclosure, and the direction of 45 degrees and the direction of −45 degrees from the X-axis respectively correspond to the "third direction" and the "fourth direction" of the present disclosure.

Modified Example 4

Figure 7:
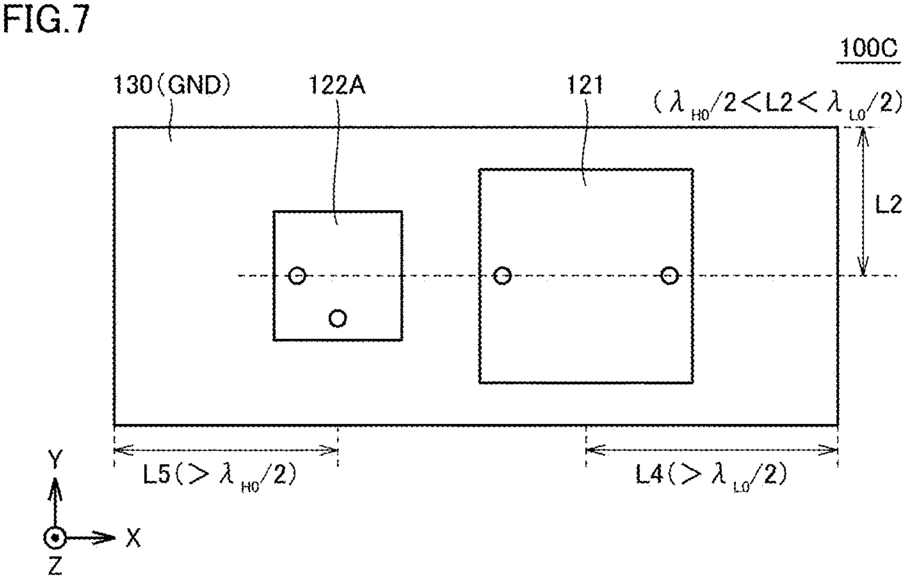
FIG. 7 is a plan transparent view of an antenna module of a modified example 4.

In a modified example 4, a configuration is described in which two feed elements are arranged side by side. FIG. 7 is a plan transparent view of an antenna module 100C of the modified example 4. The antenna module 100C is not a stack-type antenna module such as the one illustrated in FIG. 3, and in the antenna module 100C, two feed elements 121 and 122A are arranged side by side with a gap in between. More specifically, in the example of FIG. 7, the feed element 121 and the feed element 122A are arranged side by side in the X-axis direction.

In the antenna module 100C, the shortest distance L2 from the centers of the feed elements 121 and 122A to the end portion of the ground electrode GND in the Y-axis direction is shorter than ½ of the free space wavelength $\lambda_{LO}$ of a radio wave radiated from the feed element 121 and is longer than ½ of a free space wavelength $\lambda_{HO}$ of a radio wave radiated from the feed element 122A. On the other hand, a shortest distance L4 from the center of the feed element 121 to an end portion of the ground electrode GND in the X-axis direction is longer than ½ of the free space wavelength $\lambda_{LOf}$ and a shortest distance L5 from the center of the feed element 122A to an end portion of the ground electrode GND in the X-axis direction is longer than ½ of the free space wavelength $\lambda_{HO}$.

Accordingly, the feed points of the feed element 121 are arranged at locations shifted in the X-axis direction from the center of the feed element 121, and the feed points of the feed element 122A are arranged at a location shifted in the X-axis direction and a location shifted in the Y-axis direction from the center of the feed element 122A.

As described above, also in the antenna module in which two feed elements having frequency bands different from each other are arranged side by side, degradation of the antenna characteristics can be suppressed by causing the feed element to radiate a radio wave of a single polarization direction in the case where there is a constraint on the distance from the center of the radiating element to the end portion of the ground electrode GND and by causing the feed element to radiate radio waves of two polarization directions in the case where there is no constraint on that distance.

Modified Example 5

In a modified example 5, a case of an array antenna is described in which a plurality of stack-type radiating elements is arranged.

Figure 8:
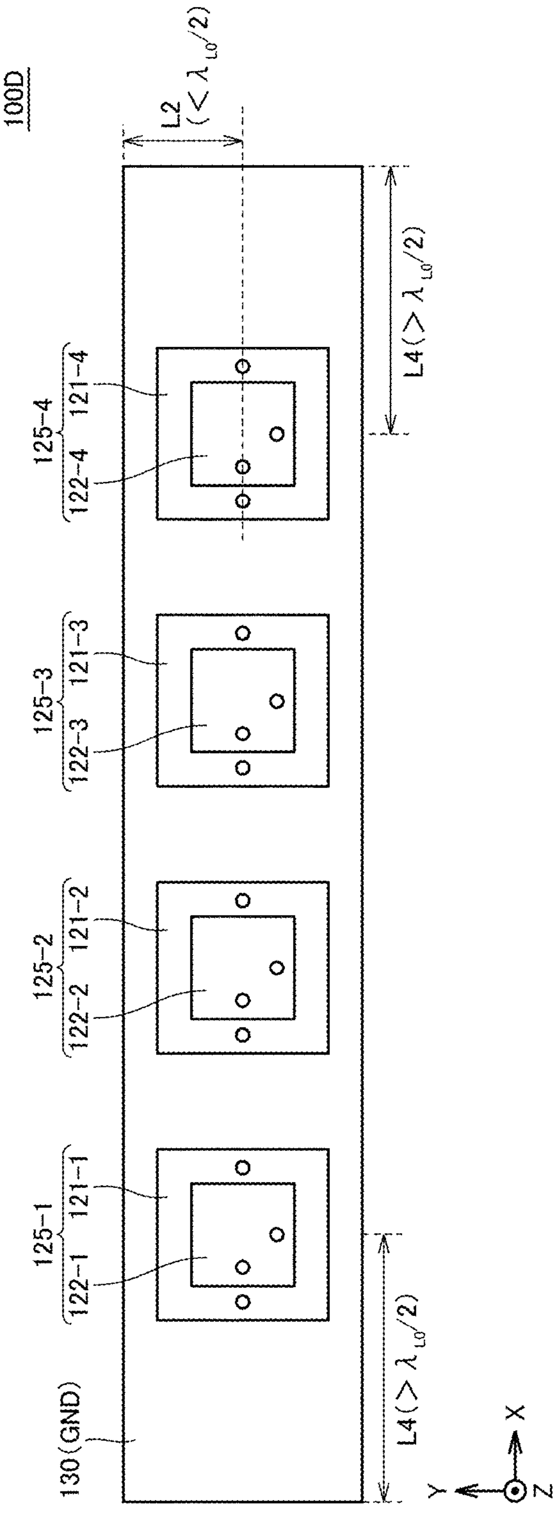
FIG. 8 is a plan transparent view of an antenna module of a modified example 5.

FIG. 8 is a plan transparent view of an antenna module 100D of the modified example 5. In the antenna module 100D, four radiating elements 125-1 to 125-4 are arranged in a row along the X-axis direction with gaps in between. The radiating element 125-1 includes a feed element 121-1 on the low frequency side and a feed element 122-1 on the high frequency side. The radiating element 125-2 includes a feed element 121-2 on the low frequency side and a feed element 122-2 on the high frequency side. The radiating element 125-3 includes a feed element 121-3 on the low frequency side and a feed element 122-3 on the high frequency side. The radiating element 125-4 includes a feed element 121-4 on the low frequency side and a feed element 122-4 on the high frequency side.

The shortest distance L2 from the center of each feed element to the end portion of the ground electrode GND in the Y-axis direction is longer than ½ of the free space wavelength $\lambda_{HO}$ of radio waves radiated from the feed elements 122-1 to 122-4 on the high frequency side, and is shorter than ½ of the free space wavelength $\lambda_{LO}$ of radio waves radiated from the feed elements 121-1 to 121-4 on the low frequency side. Further, with respect to the radiating elements 125-1 and 125-4 arranged on end portions, the shortest distance L4 from the center of the radiating element to the end of the ground electrode GND in the X-axis direction is longer than ½ of the free space wavelength $\lambda_{LO}$.

Accordingly, with respect to the feed elements 121-1 to 121-4 on the low frequency side, the feed points are arranged at locations shifted in the X-axis direction from the center of each feed element. On the other hand, with respect to the feed elements 122-1 to 122-4 on the high frequency side, the feed points are arranged at a location shifted in the X-axis direction and at a location shifted in the Y-axis direction from the center of each feed element.

As described above, also in the case where the antenna module is an array antenna, degradation of the antenna characteristics can be suppressed by causing the feed element to radiate a radio wave of a single polarization direction in the case where there is a constraint on the distance from the center of the feed element to the end portion of the ground electrode GND and by causing the feed element to radiate radio waves of two polarization directions in the case where there is no constraint on that distance.

Note that in the modified example 5, for example, the "feed element 121-1" and the "feed element 122-1" of the radiating element 125-1 respectively correspond to the "first radiating element" and the "second radiating element" of the present disclosure, and the "feed element 121-2" and the "feed element 122-2" of the radiating element 125-2 respectively correspond to a "third radiating element" and a "fourth radiating element" of the present disclosure. Further, in the modified example 5, the "Y-axis direction" corresponds to the "first direction" and the "third direction" in the present disclosure, and the "X-axis direction" corresponds to the "second direction" and a "fourth direction" in the present disclosure.

Modified Example 6

In a modified example 6, a case of an antenna module having two array antennas is described.

Figure 9:
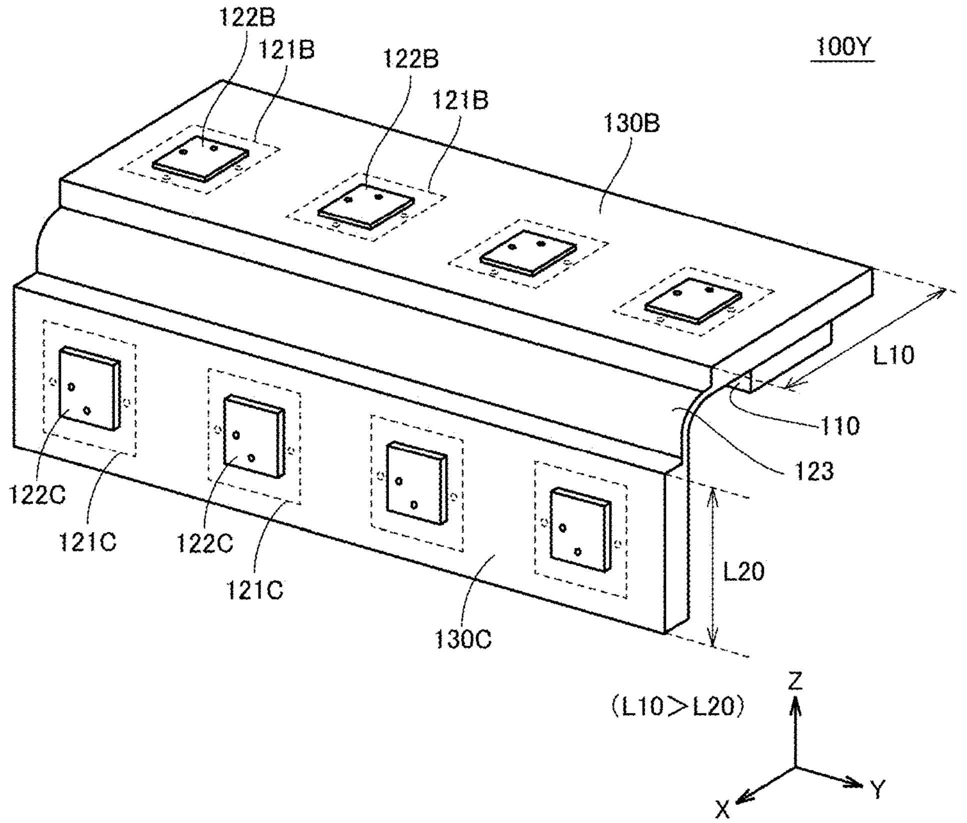
FIG. 9 is a perspective view of an antenna module of a modified example 6.

FIG. 9 is a perspective view of an antenna module 100Y of the modified example 6. The antenna module 100Y includes two different dielectric substrates 130B and 130C extending in the Y-axis direction. Each of the dielectric substrates 130B and 130C has a substantially rectangular shape whose long sides are in the Y-axis direction and has a plurality of stack-type radiating elements arranged along the Y-axis direction. Further, the RFIC 110 is arranged on a bottom surface of the dielectric substrate 130B.

The normal direction of the dielectric substrate 130B is the Z-axis direction, and the normal direction of the dielectric substrate 130C is the X-axis direction. The dielectric substrate 130B and the dielectric substrate 130C are connected to each other by a bent connection member 123. That is to say, the antenna module 100Y has a substantially L shape in the plan view seen from the Y-axis direction. With such configuration, the antenna module 100Y can radiate a radio wave in two different directions, which are the X-axis direction and the Z-axis direction.

In the dielectric substrate 130B, four radiating elements are arranged in a row along the Y-axis direction with gaps in between. Each radiating element of the dielectric substrate 130B includes a feed element 121B on the low frequency side and a feed element 122B on the high frequency side. Further, also in the dielectric substrate 130C, four radiating elements are arranged in a row along the Y-axis direction with gaps in between. Each radiating element of the dielectric substrate 130C includes a feed element 121C on the low frequency side and a feed element 122C on the high frequency side.

Here, a dimension L20 in the short side direction (Z-axis direction) of the dielectric substrate 130C is shorter than a dimension L10 in the short side direction (X-axis direction) of the dielectric substrate 130B (L10>L20). Accordingly, in the dielectric substrate 130C, the dimension of the ground electrode in the Z-axis direction is limited. Therefore, as is the case with the modified example 5, in the feed elements 121C on the low frequency side of the dielectric substrate 130C, the feed points are arranged at locations shifted in the Y-axis direction from the center of each feed element while in the feed elements 122C on the high frequency side, the feed points are arranged at a location shifted in the Y-axis direction and a location shifted in the Z-axis direction from the center of each feed element.

In the dielectric substrate 130B having a less limitation on the dimension of the ground electrode, in both the feed elements 121B and 122B, the feed points are arranged at a location shifted in the X-axis direction and at a location shifted in the Y-axis direction from the center of each feed element. Note that also in the dielectric substrate 130B, as is the case with the dielectric substrate 130C, in the case where the dimension L10 in the short side direction is made shorter, the feed element 121B on the low frequency side may be configured in such a way that the polarization direction of the feed element 121B is the Y-axis direction only.

As described above, also in the case where the antenna module has two array antennas capable of radiating radio waves in directions different from each other, degradation of the antenna characteristics can be suppressed by causing the feed element to radiate a radio wave of a single polarization direction in the case where there is a constraint on the distance from the center of the feed element to the end portion of the ground electrode GND and by causing the feed element to radiate radio waves of two polarization directions in the case where there is no constraint on that distance (modified examples 7 and 8). In the antenna module 100 of the embodiment illustrated in FIG. 3, the configuration in which the feed elements 121 and 122 are arranged in the same dielectric substrate 130 is illustrated. However, the configuration may alternatively be such that one or both of the feed elements 121 and 122 are arranged in separated different dielectric substrates.

Figure 10:
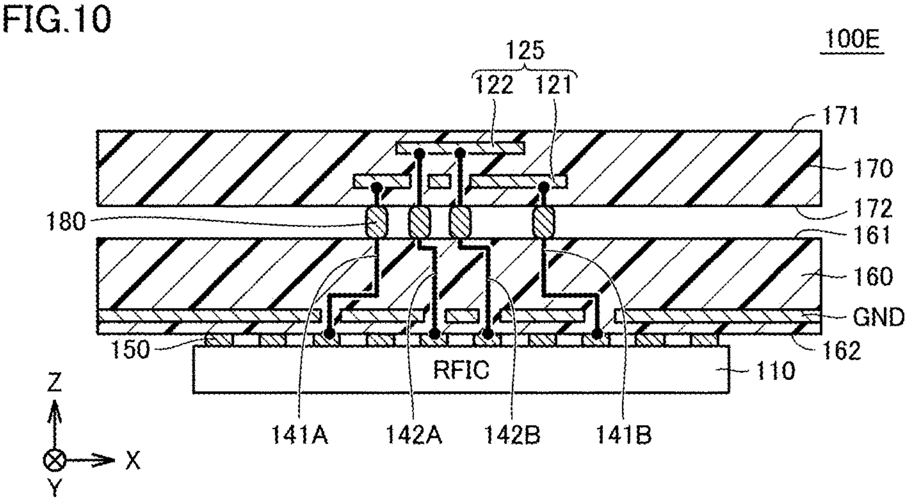
FIG. 10 is a side transparent view of an antenna module of a modified example 7.

FIG. 10 is a side transparent view of an antenna module 100E of a modified example 7.

The antenna module 100E has the configuration in which the feed elements 121 and 122 are formed in a dielectric substrate 170 and the ground electrode GND is formed in a dielectric substrate 160. The dielectric substrate 170 corresponds to, for example, a housing of the communication device 10, and radio frequency signals are supplied from the RFIC 110 arranged in the dielectric substrate 160 to the radiating elements buried in the housing in advance.

In the dielectric substrate 170, the feed element 122 is formed on a top surface 171 side, and the feed element 121 is formed on a bottom surface 172 side in such a manner as to face the feed element 122. The dielectric substrates 160 and 170 are arranged in such a way that the bottom surface 172 of the dielectric substrate 170 and a top surface 161 of the dielectric substrate 160 face each other. The RFIC 110 is mounted on the bottom surface 162 of the dielectric substrate 160 with solder bumps 150 interposed therebetween.

Connection terminals 180 such as solder bumps or the like are formed between the dielectric substrate 160 and the dielectric substrate 170 and electrically connect the dielectric substrate 160 and the dielectric substrate 170. Specifically, feed lines 141A, 141B, 142A, and 142B are connected to corresponding feed points of the feed elements via the connection terminals 180.

Figure 11:
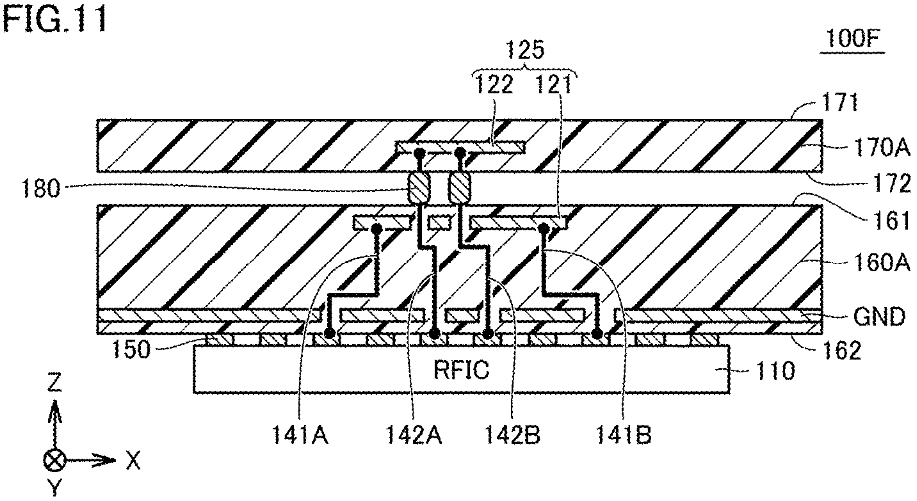
FIG. 11 is a side transparent view of an antenna module of a modified example 8.

Further, FIG. 11 is a side transparent view of an antenna module 100F of a modified example 8. The antenna module 100F has the configuration in which the feed element 122 on the high frequency side is arranged in a dielectric substrate 170A, and the feed element 121 and the ground electrode GND are formed in a dielectric substrate 160A.

The connection terminals 180 are formed between the dielectric substrate 160A and the dielectric substrate 170A and electrically connect the dielectric substrate 160A and the dielectric substrate 170A. Specifically, feed lines 142A and 142B are connected to the corresponding feed points of the feed element 122 via the connection terminals 180.

As described above, also in the antenna module having the configuration in which one or both of the feed elements are arranged in the separated different dielectric substrates, as is the case in FIG. 2, in the case where it is difficult to secure a sufficient distance between the center of the feed element 121 on the low frequency side and the end portion of the ground electrode GND, degradation of the antenna characteristics can be suppressed by not radiating a radio wave whose polarization direction is a direction of an insufficient distance and arranging the feed point in the direction (for example, an orthogonal direction) in which a sufficient distance to the ground electrode GND can be secured.

It is to be understood that the embodiments disclosed herein are exemplary in all aspects and are not restrictive. It is intended that the scope of the present invention is defined by the claims, not by the description of the foregoing embodiments, and includes all variations which come within the meaning and range of equivalency of the claims.

REFERENCE SIGNS LIST

10 Communication device
100, 100A to 100F, 100X, 100Y Antenna module
110 RFIC
111A to 111H, 113A to 113H, 117A, 117B Switch
112AR to 112HR Low noise amplifier
112AT to 112HT Power amplifier
114A to 114H Attenuator
115A to 115H Phase shifter
116A, 116B Signal combiner/splitter
118A, 118B Mixer
119A, 119B Amplifier circuit
120 Antenna device
121, 121-1 to 121-4, 121B, 121C, 122, 122-1 to 122-4, 122A to 122C Feed element
125, 125-1 to 125-4 Radiating element
130, 130B, 130C, 160, 160A, 170, 170A dielectric substrate
141A to 141C, 142A, 142B Feed line
150 Solder bump
180 Connection terminal
200 BBIC
GND Ground electrode
SP1A, SP1B, SP2A, SP2B Feed point

The invention claimed is:

1. An antenna module comprising:
a first radiating element having a flat plate shape, the first radiating element configured to radiate radio waves in a first frequency band;
a second radiating element having a flat plate shape, the second radiating element configured to radiate radio waves in a second frequency band, the second frequency band being higher in frequency than the first frequency band; and
a ground electrode arranged opposite the first radiating element and the second radiating element, wherein
in a plan view, as seen from a normal direction of the first radiating element, a distance from a center of the first radiating element to an end portion of the ground electrode in a first direction is shorter than ½ of a free space wavelength of a radio wave in the first frequency band radiated from the first radiating element, the radio wave having a single polarization direction,
a feed point of the first radiating element is arranged at a location shifted in a second direction from the center of the first radiating element, the second direction being different from the first direction,
a feed point of the second radiating element is arranged at a location shifted in a third direction from a center of the second radiating element, and
another feed point of the second radiating element is arranged at a location shifted in a fourth direction from the center of the second radiating element, the fourth direction being different from the third direction.

2. The antenna module according to claim 1, wherein
the single polarization direction is the second direction, and
the second radiating element is configured to radiate another radio wave whose polarization direction in the third direction and a third radio wave having a polarization direction in the fourth direction.

3. The antenna module according to claim 1, wherein
the second direction coincides with one of the third direction and the fourth direction.

4. The antenna module according to claim 1, wherein the second direction does not coincide with either the third direction or the fourth direction.

5. The antenna module according to claim 1, wherein a first feed point and a second feed point are arranged on the first radiating element, the first feed point being arranged at a location shifted in a negative direction of the second direction from the center of the first radiating element, the second feed point being arranged at a location shifted in a positive direction of the second direction from the center of the first radiating element, and
a phase difference between a radio frequency signal supplied to the first feed point and a radio frequency signal supplied to the second feed point is 180 degrees.

6. The antenna module according to claim 1, further comprising:
a first feed line that supplies a first radio frequency signal to at least one feed point of the first radiating element; and a second feed line, which is separate from the first feed line, supplies a different radio frequency signal to the second radiating element.

7. The antenna module according to claim 1, wherein in the plan view, the first radiating element and the second radiating element are arranged side by side in the second direction.

8. The antenna module according to claim 1, wherein in the plan view, the second radiating element overlaps the first radiating element, and the first radiating element is arranged between the second radiating element and the ground electrode.

9. The antenna module according to claim 1, further comprising:

a third radiating element having a flat plate shape, the third radiating element being configured to radiate radio waves in the first frequency band; and a fourth radiating element having a flat plate shape, the fourth radiating element being configured to radiate radio waves in the second frequency band, wherein the third radiating element is arranged separate from the first radiating element in the second direction, the fourth radiating element is arranged separate from the second radiating element in the second direction, the third radiating element is configured to radiate radio waves in a single polarization direction, a feed point of the third radiating element is arranged at a location shifted in the second direction from a center of the third radiating element, and feed points of the fourth radiating element are arranged at locations shifted in the third direction from a center of the fourth radiating element and shifted in the fourth direction from the center of the fourth radiating element.

10. The antenna module according to claim 1, wherein the third direction is orthogonal to the fourth direction.

11. The antenna module according to claim 1, further comprising:

a feed circuit that supplies a radio frequency signal to the first radiating element and the second radiating element.

12. A communication device comprising the antenna module according to claim 1.

13. An antenna module comprising:

a first radiating element having a flat plate shape, the first radiating element configured to radiate radio waves in a first frequency band;

a second radiating element having a flat plate shape, the second radiating element configured to radiate radio waves in a second frequency band, the second frequency band being higher in frequency than the first frequency band; and a ground electrode arranged opposite the first radiating element and the second radiating element, wherein in a plan view, as seen from a normal direction of the first radiating element, a dimension of the ground electrode in a first direction is shorter than a dimension of the ground electrode in a second direction, the second direction being different from the first direction, the radio wave of the first frequency band in a single polarization direction, a feed point of the first radiating element is arranged at a location shifted in the second direction from a center of the first radiating element, and feed points of the second radiating element are arranged at a location shifted in a third direction from a center of the second radiating element and at a location shifted in a fourth direction from the center of the second radiating element, the fourth direction being different from the third direction, wherein the single polarization direction is the second direction, and the second radiating element is configured to radiate the radio wave in the second frequency band with a polarization direction in the third direction and radiate another radio wave having a polarization direction in the fourth direction.

14. The antenna module of claim 13, wherein the dimension of the ground electrode in the first direction is shorter than twice a width of the first radiating element in the first direction.

15. The antenna module according to claim 13, wherein the second direction coincides with one of the third direction and the fourth direction.

16. The antenna module according to claim 13, wherein the second direction does not coincide with either the third direction or the fourth direction.

17. The antenna module according to claim 13, wherein a first feed point and a second feed point are arranged on the first radiating element, the first feed point being arranged at a location shifted in a negative direction of the second direction from the center of the first radiating element, the second feed point being arranged at a location shifted in a positive direction of the second direction from the center of the first radiating element, and a phase difference between a radio frequency signal supplied to the first feed point and a radio frequency signal supplied to the second feed point is 180 degrees.

18. The antenna module according to claim 13, further comprising:

a first feed line that supplies a first radio frequency signal to at least one feed point of the first radiating element; and a second feed line, which is separate from the first feed line, supplies a different radio frequency signal to the second radiating element.

19. A communication device comprising the antenna module according to claim 13.

* * * * *